United States Patent
Kirk et al.

(10) Patent No.: US 12,440,037 B2
(45) Date of Patent: Oct. 14, 2025

(54) BED SYSTEM WITH DEVICE CHARGING STORAGE POCKETS

(71) Applicant: Sleep Number Corporation, Minneapolis, MN (US)

(72) Inventors: Antony Kirk, Minnetonka, MN (US); Joseph Ermalovich, Santa Barbara, CA (US); Carli Hill, Oxnard, CA (US); Lori MacLachlan, Minneapolis, MN (US)

(73) Assignee: Sleep Number Corporation, Minneapolis, MN (US)

( * ) Notice: Subject to any disclaimer, the term of this patent is extended or adjusted under 35 U.S.C. 154(b) by 329 days.

(21) Appl. No.: 18/086,003

(22) Filed: Dec. 21, 2022

(65) Prior Publication Data

US 2023/0210268 A1 Jul. 6, 2023

Related U.S. Application Data

(60) Provisional application No. 63/295,194, filed on Dec. 30, 2021.

(51) Int. Cl.
*A47C 21/00* (2006.01)
*H02J 7/00* (2006.01)
*H02J 50/10* (2016.01)

(52) U.S. Cl.
CPC .......... *A47C 21/003* (2013.01); *H02J 7/0044* (2013.01); *H02J 50/10* (2016.02)

(58) Field of Classification Search
CPC ..... A47C 21/003; A47C 19/021; A47C 7/624; H02J 7/0044; H02J 50/10; A47F 3/0486; A61G 7/0503; A61G 7/0507

(Continued)

(56) References Cited

U.S. PATENT DOCUMENTS

| | | | |
|---|---|---|---|
| 4,129,909 A | | 12/1978 | Riehl |
| 5,758,972 A | * | 6/1998 | Mack ....................... A45C 3/00 5/503.1 |

(Continued)

FOREIGN PATENT DOCUMENTS

| | | | | |
|---|---|---|---|---|
| JP | 2002253622 A | * | 9/2002 | |
| JP | 2005137461 A | * | 6/2005 | |

(Continued)

OTHER PUBLICATIONS

"Surblue Bedside Caddy Hanging Bed Organizer Storage Bag Pocket for Bunk and Hospital Beds, College Dorm Rooms Baby Bed Rails,Camp 4 Pockets and 2 Hooks (Gray)", Surblue, Date: May 5, 2020, https://www.amazon.com/Surblue-Bedside-Hanging-Organizer-Hospital/dp/B087C1VHXT/ref=sr_1_5?dib=eyJ2IjoiMSJ9. (Year: 2020).*

(Continued)

*Primary Examiner* — David R Hare
*Assistant Examiner* — George Samuel Gines
(74) *Attorney, Agent, or Firm* — Fish & Richardson P.C.

(57) ABSTRACT

Disclosed are bed systems with a foundation having first and second side rails opposite each other and a pocket integrated into an exterior side of at least the first side rail at a distance from a head section of a mattress that is less than a distance from a foot section of the mattress. The pocket can include an inner pocket smaller than the pocket and positioned inside the first pocket. The pocket can include a charging port housing and a charging port supported by the charging port housing. The charging port can be a USB and/or USB-C port. The first side rail can also include a wireless charger and transmitter (e.g., induction charger) integrated therein for providing induction charging to a user device placed inside the pocket. The wireless charger and transmitter can (Continued)

be integrated into a structure of the first side rail at a location opposite the pocket.

17 Claims, 6 Drawing Sheets

(58) Field of Classification Search
USPC .......................................................... 5/503.1
See application file for complete search history.

(56) References Cited

U.S. PATENT DOCUMENTS

| | | | |
|---|---|---|---|
| D522,750 S * | 6/2006 | Girod ............................. D3/303 |
| 8,444,558 B2 | 5/2013 | Young et al. |
| 8,672,853 B2 | 3/2014 | Young |
| 8,984,687 B2 | 3/2015 | Stusynski et al. |
| 9,370,457 B2 | 6/2016 | Nunn et al. |
| 9,392,879 B2 | 7/2016 | Nunn et al. |
| 9,445,751 B2 | 9/2016 | Young et al. |
| 9,504,416 B2 | 11/2016 | Young et al. |
| 9,510,688 B2 | 12/2016 | Nunn et al. |
| 9,635,953 B2 | 5/2017 | Nunn et al. |
| 9,770,114 B2 | 9/2017 | Brosnan et al. |
| 9,844,275 B2 | 12/2017 | Nunn et al. |
| 9,931,085 B2 | 4/2018 | Young et al. |
| 10,058,467 B2 | 8/2018 | Stusynski et al. |
| 10,092,242 B2 | 10/2018 | Nunn et al. |
| 10,149,549 B2 | 12/2018 | Erko et al. |
| 10,182,661 B2 | 1/2019 | Nunn et al. |
| 10,201,234 B2 | 2/2019 | Nunn et al. |
| 10,251,490 B2 | 4/2019 | Nunn et al. |
| 10,342,358 B1 | 7/2019 | Palashewski et al. |
| 10,441,086 B2 | 10/2019 | Nunn et al. |
| 10,441,087 B2 | 10/2019 | Karschnik et al. |
| 10,448,749 B2 | 10/2019 | Palashewski et al. |
| 10,492,969 B2 | 12/2019 | Stusynski et al. |
| 10,632,032 B1 | 4/2020 | Stusynski et al. |
| 10,646,050 B2 | 5/2020 | Nunn et al. |
| 10,674,832 B2 | 6/2020 | Brosnan et al. |
| 10,716,512 B2 | 7/2020 | Erko et al. |
| 10,729,255 B2 | 8/2020 | Erko et al. |
| 10,736,432 B2 | 8/2020 | Brosnan et al. |
| 10,750,875 B2 | 8/2020 | Palashewski et al. |
| 10,827,846 B2 | 11/2020 | Karschnik et al. |
| 10,881,219 B2 | 1/2021 | Nunn et al. |
| 10,957,335 B2 | 3/2021 | Demirli et al. |
| 10,959,535 B2 | 3/2021 | Karschnik et al. |
| D916,745 S | 4/2021 | Stusynski et al. |
| 10,980,351 B2 | 4/2021 | Nunn et al. |
| 11,096,849 B2 | 8/2021 | Stusynski et al. |
| 11,122,909 B2 | 9/2021 | Palashewski et al. |
| 11,160,683 B2 | 11/2021 | Nunn et al. |
| 11,206,929 B2 | 12/2021 | Palashewski et al. |
| D954,725 S | 6/2022 | Stusynski et al. |
| D968,436 S | 11/2022 | Stusynski et al. |
| D975,121 S | 1/2023 | Stusynski et al. |
| 2008/0077020 A1 | 3/2008 | Young et al. |
| 2010/0170043 A1 | 7/2010 | Young et al. |
| 2011/0144455 A1 | 6/2011 | Young et al. |
| 2014/0274204 A1 * | 9/2014 | Williams .............. H02J 7/0013 455/556.1 |
| 2014/0277822 A1 | 9/2014 | Nunn et al. |
| 2016/0015184 A1 | 1/2016 | Nunn et al. |
| 2016/0324708 A1 * | 11/2016 | Ellis ..................... A61G 7/0507 |
| 2016/0367039 A1 | 12/2016 | Young et al. |
| 2017/0065220 A1 | 3/2017 | Young et al. |
| 2017/0128001 A1 | 5/2017 | Torre et al. |
| 2017/0143269 A1 | 5/2017 | Young et al. |
| 2018/0249839 A1 * | 9/2018 | Cammack .............. A47C 7/624 |
| 2019/0053761 A1 | 2/2019 | Torre et al. |
| 2019/0069840 A1 | 3/2019 | Young et al. |
| 2019/0200777 A1 | 7/2019 | Demirli et al. |
| 2019/0201265 A1 | 7/2019 | Sayadi et al. |
| 2019/0201266 A1 | 7/2019 | Sayadi et al. |
| 2019/0201267 A1 | 7/2019 | Demirli et al. |
| 2019/0201268 A1 | 7/2019 | Sayadi et al. |
| 2019/0201270 A1 | 7/2019 | Sayadi et al. |
| 2019/0201271 A1 | 7/2019 | Grey et al. |
| 2019/0328146 A1 | 10/2019 | Palashewski et al. |
| 2019/0328147 A1 | 10/2019 | Palashewski et al. |
| 2019/0343274 A1 * | 11/2019 | Cass ...................... A47C 7/626 |
| 2020/0153259 A1 * | 5/2020 | Bober ........................ H02J 7/02 |
| 2020/0253349 A1 * | 8/2020 | Quartarone, III ........ A45C 5/06 |
| 2020/0315367 A1 | 10/2020 | Demirli et al. |
| 2020/0336010 A1 | 10/2020 | Holmvik et al. |
| 2020/0359807 A1 | 11/2020 | Brosnan et al. |
| 2020/0367663 A1 | 11/2020 | Nunn et al. |
| 2020/0405070 A1 | 12/2020 | Palashewski et al. |
| 2020/0405240 A1 | 12/2020 | Palashewski et al. |
| 2021/0000261 A1 | 1/2021 | Erko et al. |
| 2021/0034989 A1 | 2/2021 | Palashewski et al. |
| 2021/0045541 A1 | 2/2021 | Nunn et al. |
| 2021/0068552 A1 | 3/2021 | Palashewski et al. |
| 2021/0112992 A1 | 4/2021 | Nunn et al. |
| 2021/0142894 A1 | 5/2021 | Raisanen |
| 2021/0267380 A1 | 9/2021 | Stusynski |
| 2021/0282570 A1 | 9/2021 | Karschnik et al. |
| 2021/0289947 A1 | 9/2021 | Karschnik et al. |
| 2021/0314405 A1 | 10/2021 | Demirli et al. |
| 2021/0346218 A1 | 11/2021 | Stusynski et al. |
| 2021/0376658 A1 * | 12/2021 | Marino .................. A45C 15/06 |
| 2021/0386209 A1 | 12/2021 | Grutta |
| 2021/0401164 A1 * | 12/2021 | Cass ...................... A47C 17/86 |
| 2022/0000273 A1 | 1/2022 | Palashewski et al. |
| 2022/0000654 A1 | 1/2022 | Nunn et al. |
| 2022/0225786 A1 | 7/2022 | Palashewski et al. |
| 2022/0265059 A1 | 8/2022 | Palashewski et al. |
| 2022/0305231 A1 | 9/2022 | Stusynski et al. |
| 2022/0346565 A1 | 11/2022 | Karschnik et al. |
| 2022/0354431 A1 | 11/2022 | Molina et al. |
| 2022/0386947 A1 | 12/2022 | Molina et al. |
| 2022/0395233 A1 | 12/2022 | Siyahjani et al. |
| 2023/0018558 A1 | 1/2023 | Demirli et al. |
| 2023/0035257 A1 | 2/2023 | Karschnik et al. |
| 2023/0037482 A1 | 2/2023 | Demirli et al. |
| 2023/0054736 A1 | 2/2023 | Holmvik et al. |
| 2023/0063373 A1 | 3/2023 | Young et al. |

FOREIGN PATENT DOCUMENTS

| | | | |
|---|---|---|---|
| KR | 20190086309 A | * | 7/2019 |
| TW | M544847 U | * | 7/2017 |

OTHER PUBLICATIONS

International Preliminary Report on Patentability in International Appln. No. PCT/US2022/053651, mailed on Jul. 11, 2024, 8 pages.
U.S. Appl. No. 16/719,177, filed Dec. 18, 2019, Nunn et al.
U.S. Appl. No. 17/523,349, filed Nov. 10, 2021, Dixon et al.
U.S. Appl. No. 17/745,508, filed May 16, 2022, Nunn et al.
U.S. Appl. No. 17/984,752, filed Nov. 10, 2022, Karschnik et al.
U.S. Appl. No. 17/986,351, filed Nov. 14, 2022, Nunn et al.
U.S. Appl. No. 18/075,913, filed Dec. 6, 2022, Johnston et al.
U.S. Appl. No. 18/084,944, filed Dec. 20, 2022, Molina.
U.S. Appl. No. 18/086,003, filed Dec. 21, 2022, Kirk et al.
U.S. Appl. No. 18/086,104, filed Dec. 21, 2022, Hill et al.
U.S. Appl. No. 18/087,078, filed Dec. 22, 2022, Hill et al.
U.S. Appl. No. 18/087,973, filed Dec. 23, 2022, Hill et al.
U.S. Appl. No. 18/091,713, filed Dec. 30, 2022, MacLachlan et al.
U.S. Appl. No. 18/105,468, filed Feb. 3, 2023, Sayadi et al.
U.S. Appl. No. 29/814,835, filed Nov. 9, 2021, Dixon et al.
U.S. Appl. No. 29/837,293, filed May 4, 2022, Stusynski et al.
U.S. Appl. No. 29/881,955, filed Jan. 9, 2023, Stusynski et al.
International Search Report and Written Opinion in International Appln. No. PCT/US2022/053651, mailed on Jun. 2, 2023, 15 pages.
Kheangda, "Bedside Table Storage Organiser Bedside Caddy Sofa Bed Desk Felt Side Caddy Pocket with 2 pockets for organisation Tablet Magazine Mobile Phone Small Objects : Amazon.de: Home & Kitchen," Oct. 2, 2017, retrieved from URL<https://www.amazon.

(56) References Cited

OTHER PUBLICATIONS de/-/en/Bedside-Organiser-pockets-organisation-Magazine/dp/B075JZKVFF?th-1, 3 pages.

* cited by examiner

BED SYSTEM WITH DEVICE CHARGING STORAGE POCKETS

INCORPORATION BY REFERENCE

This application claims priority to U.S. Provisional Application Ser. No. 63/295,194, filed on Dec. 30, 2021, the disclosure of which is incorporated by reference in its entirety.

TECHNICAL FIELD

This document describes devices, systems, and methods generally related to a bed system with storage pockets having device charging capabilities.

BACKGROUND

In general, a bed is a piece of furniture used as a location to sleep or relax. Many modern beds include a soft mattress on a bed frame. The mattress may include springs, foam material, and/or an air chamber to support the weight of one or more occupants.

SUMMARY

The document generally relates to a bed system having storage pockets with device charging capabilities. More specifically, a foundation of the bed system can include side rails. Each of the side rails can include a storage pocket. The storage pockets can be positioned at locations along the side rails that are easy to reach by a user of the bed system, regardless of whether the user is laying flat or elevated to a variety of sleeping and/or reading positions. The storage pockets can be sized to hold items such as magazines, books, newspapers, laptops, and/or tablets. The storage pockets can also be sized to hold mobile devices, such as smartphones, cellphones, and wearable devices.

The storage pockets can include device charging capabilities. For example, a storage pocket can include one or more wired charging ports, such as USB and USB-C charging ports. The user can then connect their mobile device with a cable to one of the charging ports. Power for charging the devices can be provided via a power supply of the bed system, which can be plugged into an external power source, such as a wall outlet.

In some implementations, the storage pockets can include wireless charging capabilities. For example, an induction charger can be integrated into each of the side rails at a location parallel to a portion of each of the storage pockets. When the user places their mobile device inside one of the pockets, the mobile device can be wirelessly charged via the induction charger.

In yet some implementations, each of the storage pockets can include an additional pocket. The additional pocket can be smaller in dimensions than the storage pocket and can be positioned inside the storage pocket. The additional pocket can be configured to contain mobile devices, or devices up to certain dimensions/size. The induction charger described herein can be integrated into the side rail at a location parallel to a midpoint of the additional pocket. Therefore, when the user places their mobile device inside the additional pocket, the mobile device can be wirelessly charged via the induction charger.

One or more embodiments described herein can include a bed system including a foundation having a first side rail and a second side rail, the first side rail opposite the second side rail, and a pocket integrated into an exterior side of the first side rail.

In some implementations, the embodiments described herein can optionally include one or more of the following features. For example, the bed system can also include a second pocket integrated into the second side rail. The bed system can include a mattress supported by the foundation. The pocket can be integrated into the first side rail at a distance from a head section of the mattress that is less than a distance from a foot section of the mattress. The pocket can include an inner pocket, the inner pocket being smaller than the pocket and positioned inside the first pocket. The inner pocket can be positioned at a lateral edge of the pocket and can extend a distance towards a midpoint of the pocket.

In some implementations, the pocket further can include a charging port housing and a charging port supported by the charging port housing. The bed system can also include a charging port housing positioned adjacent to the inner pocket. The bed system can include a charging port mounted in the inner pocket adjacent an inner surface of the inner pocket. The bed system can include a charging port housing positioned inside the inner pocket. The charging port housing can be positioned along an edge of the inner pocket that is proximate a midpoint of the pocket. The charging port can be a USB port, and the pocket further can include a USB-C port. The bed system further can include a power supply. The USB port and the USB-C port can be in wired communication with the power supply to receive power for charging a user device placed in the pocket. The power supply can wiredly connect to an outlet in a sleep environment, the power supply can be configured to provide power to components of the bed system.

The first side rail can include a wireless charger and a transmitter integrated therein for providing induction charging to a user device placed inside the pocket. The wireless charger and the transmitter can be integrated into a structure of the first side rail at a location opposite the pocket.

In some implementations, the bed system can include an induction charger integrated into a structure of the first side rail. The induction charger can be integrated into the structure of the first side rail at a location parallel a midpoint of the pocket, and the induction charger can be configured to wirelessly charge a user device placed inside the pocket. The induction charger can provide 5-15 W of output. The pocket can have a width within a range of 250-600 mm.

The pocket can be made of a same material as the first side rail. Moreover, the inner pocket can be made of a different material than at least one of the first side rail and the pocket. The inner pocket can be made of a same material as at least one of the first side rail and the pocket. The inner pocket can have a width within a range of 3-10 inches. The inner pocket can have a tolerance of ⅛ inch in length, ⅛ inch in width, and ⅛ inch in height.

One or more embodiments described herein can include a bed system including a foundation having a first side rail and a second side rail, a first pocket integrated into an exterior side of the first side rail, and a second pocket integrated into the exterior side of the first side rail and positioned inside the first pocket.

In some implementations, the embodiments described herein can optionally include one or more of the following features. For example, the second pocket can be smaller than the first pocket. The second pocket can be positioned at a lateral edge of the first pocket and can extend a distance towards a midpoint of the first pocket. The first pocket further can include a charging port housing and a charging port supported by the charging port housing. The charging port housing can be positioned adjacent to the second pocket. The charging port can be mounted in the second pocket adjacent an inner surface of the second pocket. The charging port housing can be positioned along an edge of the second pocket that can be proximate a midpoint of the first pocket. The first side rail can include a wireless charger and a transmitter integrated therein for providing induction charging to a user device placed inside at least one of the first pocket and the second pocket. Moreover, the wireless charger and the transmitter can be integrated into a structure of the first side rail at a location opposite a midpoint of at least one of the first pocket and the second pocket.

One or more embodiments described herein can include a bed system including a foundation having a first side rail and a second side rail, and a pocket integrated into an exterior side of the first side rail having wired charging capabilities for a user device placed therein.

In some implementations, the embodiments described herein can optionally include one or more of the following features. For example, the pocket can include a charging port housing and a charging port supported by the charging port housing. The charging port can be a USB port, and the pocket further can include a USB-C port. The bed system can also include a power supply, and the USB port and the USB-C port can be in wired communication with the power supply to receive power for charging a user device placed in the pocket. The bed system can include a second pocket integrated into an exterior side of the second side rail having wired charging capabilities for a second user device placed therein.

One or more embodiments described herein can also include a bed system including a foundation having a first side rail and a second side rail, and a pocket integrated into an exterior side of the first side rail having inductive charging capabilities for a user device placed therein.

In some implementations, the embodiments described herein can optionally include one or more of the following features. For example, the first side rail can include a wireless charger and a transmitter integrated therein for providing induction charging to a user device placed inside the pocket. The wireless charger and the transmitter can be integrated into a structure of the first side rail at a location opposite the pocket. The bed system can also include an induction charger integrated into a structure of the first side rail. The induction charger can be integrated into the structure of the first side rail at a location parallel a midpoint of the pocket. The induction charger can be configured to wirelessly charge a user device placed inside the pocket. The bed system can also include a second pocket integrated into an exterior side of the second rail having inductive charging capabilities for a second user device placed therein.

One or more embodiments described herein can also include a bed system including a foundation having a first side rail and a second side rail, a pocket integrated into an exterior side of the first side rail having charging capabilities for a user device placed therein, and a power supply that can be configured to provide power to components of the bed system, the power supply being in wired communication with an external power source.

In some implementations, the embodiments described herein can optionally include one or more of the following features. For example, the first side rail can include a wireless charger and a transmitter integrated therein for providing induction charging to a user device placed inside the pocket. The wireless charger and the transmitter can be integrated into a structure of the first side rail at a location opposite the pocket. The bed system can also include an induction charger that can be integrated into a structure of the first side rail. The induction charger can be integrated into the structure of the first side rail at a location parallel a midpoint of the pocket, and the induction charger can be configured to wirelessly charge a user device placed inside the pocket. The pocket further can include a charging port housing and a charging port supported by the charging port housing that can receive power from the power supply. The charging port can be a USB port and the pocket further can include a USB-C port. The USB port and the USB-C port can be in wired communication with the power supply to receive power for charging a user device placed in the pocket. The induction charger can be placed inside a padded cavity in the structure of the first side rail and an upholstery fabric material of the first side rail can cover the induction charger inside the padded cavity.

One or more embodiments described herein can include a bed system including a foundation having first and second side rails, and first and second pockets integrated into external sides of the first and second side rails, respectively.

In some implementations, the embodiments described herein can optionally include one or more of the following features. For example, each of the first and second pockets can have a width within a range of 4-20 inches. Each of the first and second pockets can be made of a same material as the first and second side rails, respectively. Each of the first and second pockets can be made of a different material than the first and second side rails, respectively. Each of the first and second pockets can be closer to a head end of the foundation than a foot end of the foundation.

The devices, system, and techniques described herein may provide one or more of the following advantages. For example, the integrated charging and storage pockets can provide ease of access to devices and other items while the user is in bed. Nonintrusive design of the pockets integrated into side rails of the foundation can make it easy for the user to reach, regardless of whether the user is laying down or in another position in the bed. The pockets also reduce visible nightstand clutter, since the user can now store their items in the pockets rather than on the nightstand(s). Moreover, the pockets can be designed as left-sided and right-sided pockets for integration into respective left and right side rails of the foundation. Thus, regardless of which side of the bed the user is on, the user can easily reach one or more of the pockets.

As another example, the pockets can provide for convenient device charging capabilities. The disclosed techniques can offer a complete charging solution that gives the user multiple charging options right from the bed. The user can charge devices using either USB or USB-C charging ports that are integrated into the pockets. The user can also charge devices using induction charging, which is especially beneficial of the user does not have a charging cable at hand to plug into one of the charging ports. The user can charge multiple devices at a time. The user can also charge their device(s) while the user is sleeping or otherwise in the bed without having to get up and plug the device(s) into wall outlets of a surrounding environment.

The disclosed bed system can also have a discrete and nonintrusive power cable configuration. In other words, only one cable can extend from the bed and plug into an external power source, such as a wall outlet in a bedroom. The cable can transmit power to various components of the bed system, including the wired charging ports in the pockets and the induction chargers in the side rails of the foundation. For example, cables can connect the charging ports and the induction chargers to a port in the bed system. Another cable can run from the port of the bed system to the wall outlet or other external power source to supply power to the components of the bed system. Since only one cable connects to the wall outlet to supply power to all the components of the bed system, other wall outlets and/or external power sources remain free to be used for supplying power to other components, such as nightstand devices and lights in the bedroom.

Moreover, the bed system can have a strong and durable design, engineered using high quality textiles, fine hardwoods, durable leather, and other materials that make the bed system sturdy. The bed system can also have accented tailoring and layering of materials to provide an aesthetically pleasing appearance. For example, the pockets can be made with a same material as the side rails of the foundation so that the pockets blend in with the side rails and are unobtrusive. This provides an aesthetically pleasing appearance of the bed system. As another example, the charging ports can be housed in a more rigid structure such as a charging port housing inside each of the pockets. The charging port housing can maintain cables and other wiring that may be used to provide power to the charging ports. The charging port housing can thus protect the cables and other wiring from being moved around or damaged when items are placed in and pulled out of the pockets.

Furthermore, while designed to support sleep needs for users of any age, the disclosed features and techniques of the bed system can also satisfy needs of a discrete aging population. Thus, the disclosed techniques can provide unique and dynamic abilities to adapt to any user of the bed system, no matter their needs.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

This document generally relates to a bed system storage pockets with device charging capabilities. The bed system can include a foundation having first and second side rails. Each of the side rails can include a pocket for storing items. Each of the pockets can also include wired charging capabilities and wireless charging capabilities. For example, a pocket can include USB and USB-C charging ports. A user of the bed system can plug in any type of device into either of the charging ports to charge their device. As another example, the pocket can include inductive charging. An induction charger can be integrated into the side rail parallel to a portion of the pocket where the user can place their device. When the device is placed inside the pocket, the device can be wirelessly charged via inductive charging. The pocket can also include a smaller, inner pocket, which can be configured to hold smaller items, including but not limited to smartphones, mobile phones, wearable devices, headphones, glasses, and/or remotes. In some implementations, the induction charger can be integrated into the side rail parallel to a midpoint of the smaller, inner pocket. Therefore, when a device is placed inside the smaller, inner pocket, the device can be automatically charged via induction charging.

Figure 1:
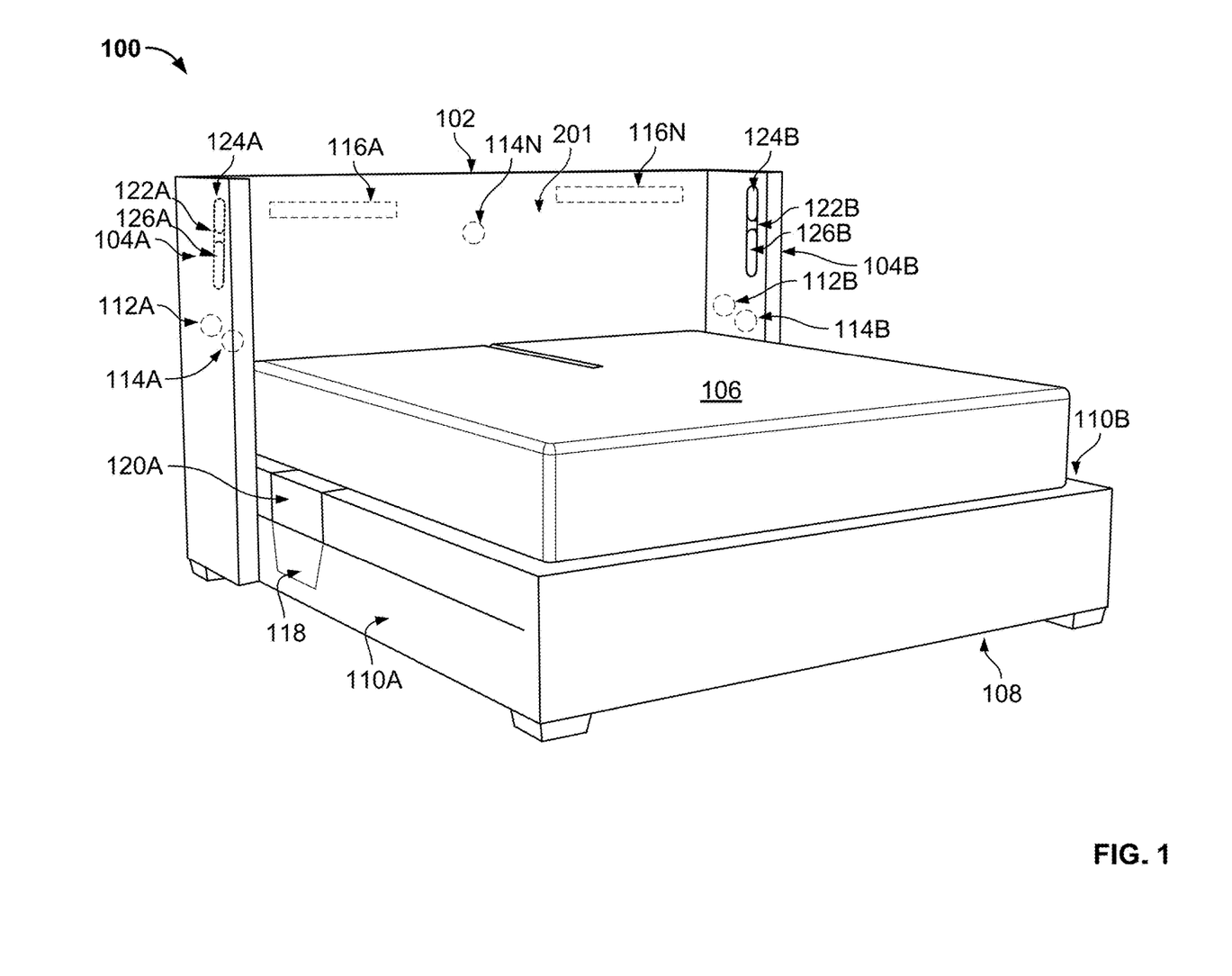
FIG. 1 depicts an example bed system.

Referring to the figures, FIG. 1 depicts an example bed system 100. The bed system 100 can include features that provide an improved sleep experience for a user of the bed system, including users having different age, conditions, demographics, and/or preferences.

The bed system 100 can include a headboard 102, foundation 108, and mattress 106. The mattress 106 can be sized for one user, such as a twin mattress. The mattress 106 can also be sized for two users, such as a full, queen, king, and/or California king mattress. As illustrated in FIG. 1, the mattress 106 can be a king mattress having a split top portion and a joined bottom portion. The mattress 106 can be an air mattress or other suitable mattress. The mattress 106 can also be articulable or stationary.

The headboard 102 can include a main headboard portion 201 and wings 104A and 104B. The wings 104A and 104B can extend a length along lateral edges of the mattress 106. In some implementations, the length can be 5 to 20 inches. In some implementations, the length can be 13 inches. For example, the wings 104A and 104B can extend to a length along the lateral edges of the mattress 106 that includes a head portion of the mattress 106 where the user may place their head on a pillow. As a result, the wings 104A and 104B can act as a barrier to some noises that may exist in a surrounding sleep environment.

The headboard 102 can include features for improving sleep experiences of the user of the bed system 100. For example, the headboard 102 can include speakers 112A and 112B, microphones 114A-N, lights 116A-N, docks 122A and 122B, reading lights 124A and 124B, and remotes 126A and 126B. The speakers 112A and 112B can be integrated into the wings 104A and 104B, respectively. The speakers 112A and 112B can be configured to play white and/or pink noise to reduce and/or cancel noise in the surrounding sleep environment. The user can connect one or more user devices (e.g. mobile phone, tablet, PC, or other computer) or another audio input to the speakers 112A and 112B (e.g., Bluetooth connection) to control audio that is played through the speakers 112A and 112B.

The microphones 114A and 114B can be integrated into the wings 104A and 104B, respectively. Additional microphones can also be integrated into other portions of the bed system 100. For example, the microphone 114N can be integrated into a midpoint of the headboard 102. Additional microphones can be integrated into the headboard 102 for each respective user/side of the mattress 106. The microphones 114A-N can be configured to detect noise in the surrounding sleep environment (such as snore or breathing sounds of one or both users, external noises, etc.). Based on the detected noise, the bed system 100 (e.g., a bed controller, such as controller 500 in FIG. 5) can generate an inverse sound wave to play through the speakers 112A and 112B to reduce and/or cancel the detected noise. As a result, the user of the bed system 100 can experience improved sleep quality undisturbed by noises in the surrounding sleep environment (e.g., snore or breathing sounds of one or both users, external noises, etc.).

The lights 116A-N can be integrated into a back portion of the headboard 102. The lights 116A-N, for example, can be recessed into the back portion of the headboard 102 and configured to provide ambient lighting that supports the user's circadian rhythm with wake and sleep routines.

The docks 122A and 122B can be integrated into the wings 104A and 104B, respectively. The docks 122A and 112B can house components such as the reading lights 124A and 124B, respectively, and the remotes 126A and 126B, respectively. These components can be kept in easy to access locations. In some embodiments, the user of the bed system 100 can access either of the reading lights 124A and 124B and/or the remotes 126A and 126B regardless of whether the user is laying down, sitting up, or otherwise inclined on the mattress 106. The reading lights 124A and 124B can extend out from the respective docks 122A and 122B and be tilted in a desired direction of the user. The user can also adjust the reading lights 124A and 124B color and intensity based on their particular needs and preferences. The remotes 126A and 126B can be used by the user to adjust their respective side of the bed system 100. For example, the remotes 126A and 126B can be used to adjust audio (e.g., volume level, turning audio on or off, setting a timer to automatically turn off the audio, etc.) that is played through the speakers 112A and 112B.

The foundation 108 includes side rails 110A and 110B. Pockets 118A and 118B (pocket 118B is not depicted in FIG. 1) can be integrated into the side rails 110A and 110B, respectively. The pockets 118A and 118B can be storage pockets for holding objects including but not limited to mobile devices (e.g., laptops, tablets, mobile phones, smart phones, etc.), books, magazines, and other items. The pockets 118A and 118B can include integrated inductive charging capabilities to charge one or more of the mobile devices placed therein. The pockets 118A and 118B can also include charging ports to provide wired charging of the mobile devices. The charging ports can include USB and USB-C ports. The pockets 118A and 118B can be integrated into portions of the side rails 110A and 110B that are easy to reach by the user of the bed system 100, regardless of whether the user is laying down, sitting up, or inclined to another position on the mattress 106.

Moreover, plates 120A and 120B (plate 120B is not depicted in FIG. 1) can be removably attached to a portion of the side rails 110A and 110B, respectively, that is aligned with and above the pockets 118A and 118B, respectively. The plates 120A and 120B can cover holes that are integrated into the side rails 110A and 110B and configured to receive and support side rail accessories. The side rail accessories (not shown in FIG. 1) can include tabletops and handrails, which can improve functionality of the bed system 100 and assist the user of the bed system 100 to get in and out of bed. The plates 120A and 120B can provide an aesthetically pleasing appearance of the foundation 108 when side rail accessories are not attached to the side rails 110A and 110B. When the side rail accessories are attached to either of the side rails 110A and 110B, the corresponding plate 120A or 120B can be removed so that the holes are exposed to receive supports of the side rail accessories.

Figure 2:
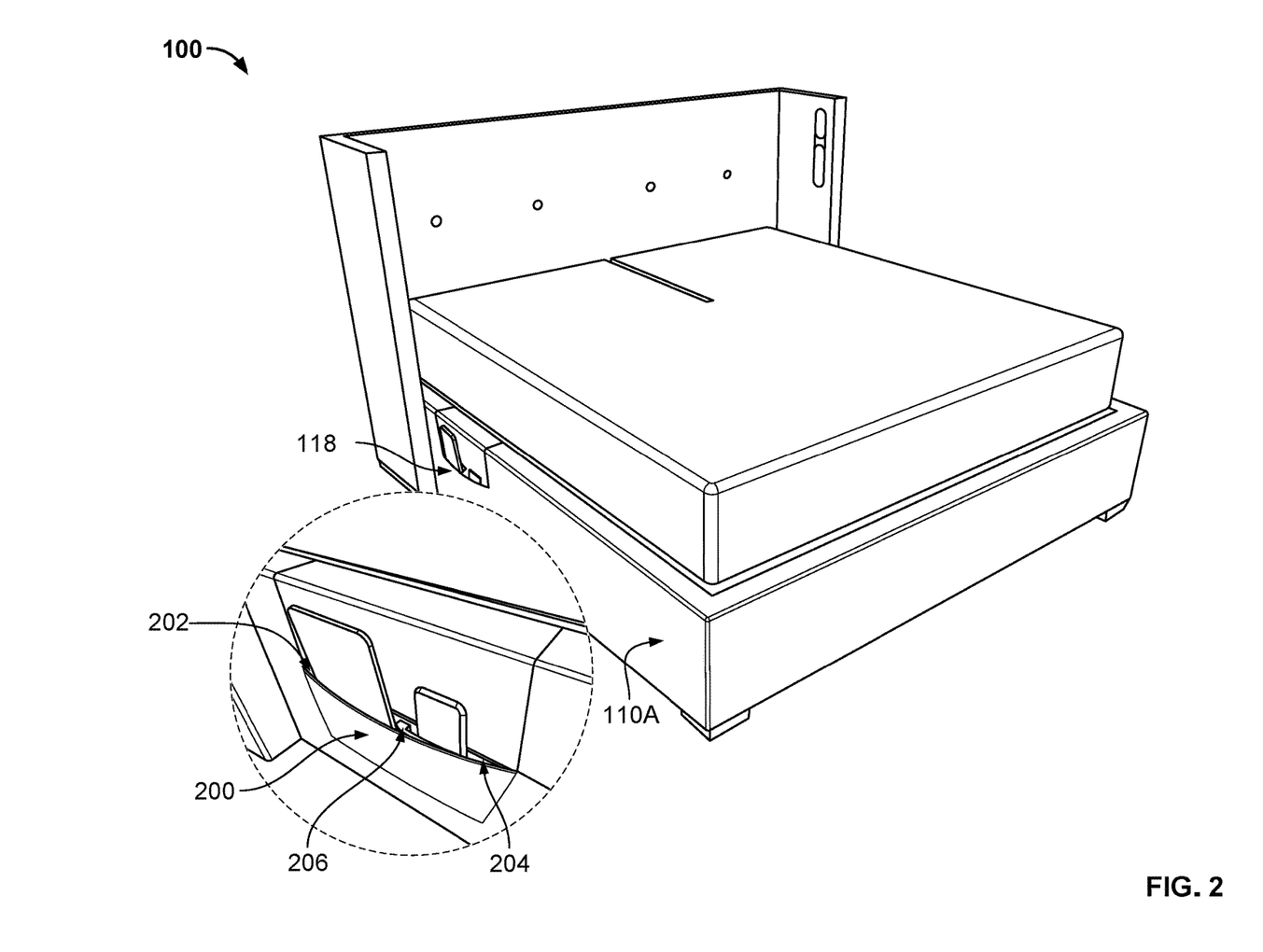
FIG. 2 depicts a first embodiment of the pocket on a side rail of the bed system.
Figure 3:
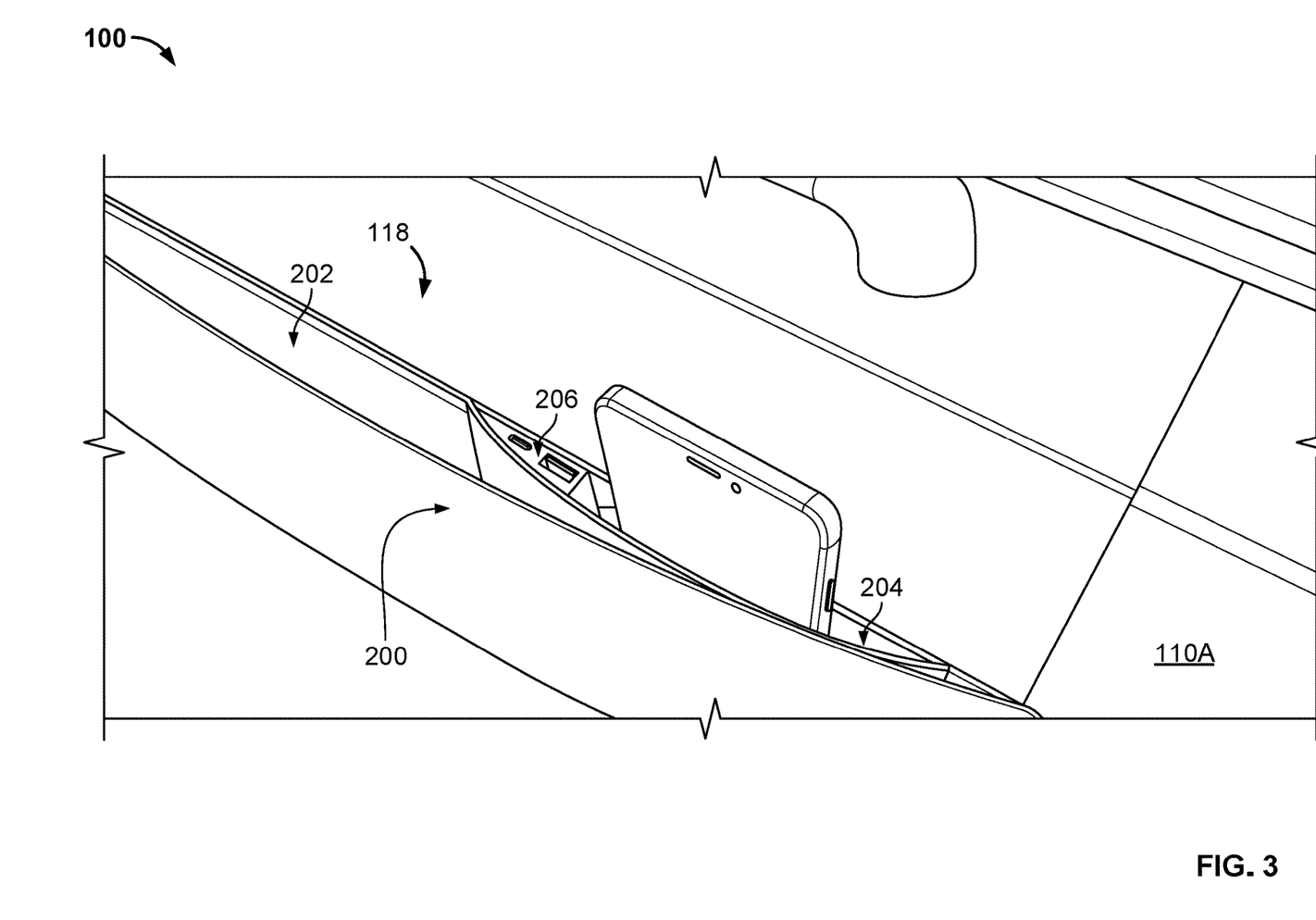
FIG. 3 depicts a second embodiment of the pocket on the side rail of the bed system.
Figure 4:
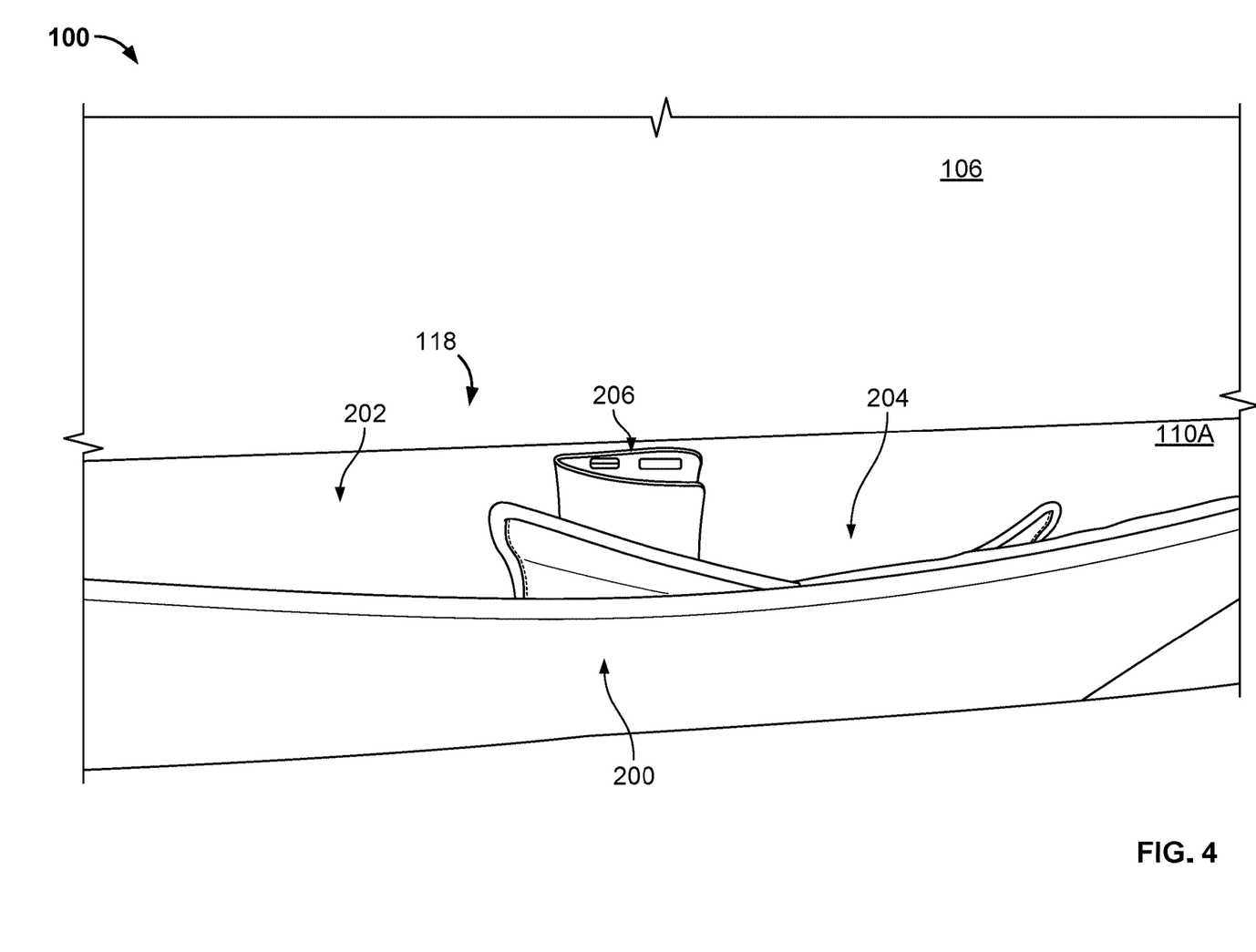
FIG. 4 depicts a third embodiment of the pocket on the side rail of the bed system.

FIG. 2 depicts a first embodiment of the pocket 118 on the side rail 110A of the bed system 100. FIG. 3 depicts a second embodiment of the pocket 118 on the side rail 110A of the bed system 100. FIG. 4 depicts a third embodiment of the pocket 118 on the side rail 110A of the bed system 100. Referring to FIGS. 2, 3, and 4, as described herein, the pocket 118 can be integrated into an exterior side of each of the side rails 110A and 110B, where the side rails 110A and 110B are opposite each other. The pockets 118 can be sewn into an upholstery fabric of each of the side rails 110A and 110B. In some implementations, the pockets 118 can be attached to the side rails 110A and 110B using hook and loop fasteners. The pockets 118 can provide easy access to a user's devices and other items throughout the night and while the user is in the bed system 100.

The pocket 118 can be positioned at a location along the side rail 110A that is closer to a head of the bed system 100 than a foot end of the bed system 100. For example, the pocket 118 can be positioned within a range of 400-1000 mm from the head end of the bed system 100. As a result, the pocket 118 can be easily reached by a user of the bed system 100, regardless of whether the user is laying in a flat position or in another position in the bed system 100 (e.g., sitting up, inclined in some way, etc.).

The pocket 118 can include an outer panel 200 made of a same flexible material (e.g. a fabric) as the side rail 110A. As a result, the pocket 118 can blend in with the side rail 110 for an aesthetically pleasing appearance. The pocket 118 can also include some flexibility to expand when larger items, such as thick magazines or books, are placed inside the pocket 118. Otherwise, the pocket 118 material can have a lining so that the outer panel 200 is thicker and more rigid than a thin piece of upholstery fabric. Therefore, the pocket 118 can maintain its shape when items are placed therein.

The outer panel 200 can define a large cavity 202 of the pocket 118, which can hold items that are placed inside the pocket 118. In some implementations, the pocket 118 can have a length of 16 inches. The pocket 118 can have a length of one or more other sizes and/or ranges, such as any length ranging from 10 to 20 inches. Large items, such as books, magazines, laptops, and/or tablets can be stored in the pocket 118.

An inner pocket 204 can be defined in the cavity 202 of the pocket 118. Therefore, the inner pocket 204 can be smaller than the pocket 118 and positioned inside the pocket 118. The inner pocket 118 can be positioned at a lateral edge of the pocket 118 and can extend a distance towards a midpoint of the pocket 118. In some implementations, the inner pocket 204 can be positioned adjacent to the pocket 118 along the side rail 110A. The inner pocket 204 can then be integrated into the side rail 110A similarly to the pocket 118.

The inner pocket 204 can be sized to fit smaller items, such as smartphones, cellphones, wearable devices, remotes, headphones, and/or glasses. In some implementations, the inner pocket 204 can have a length of 5 inches. The inner pocket 204 can also have a length of one or more other sizes and/or ranges, such as any length ranging from 3 to 10 inches. The inner pocket 204 can also have a stretch tolerance of approximately ⅛ inch in each dimension (length, width, and height) to accommodate for development of larger smartphones and other mobile devices. Moreover, the user can place items inside the pocket 118 in front of the inner pocket 204, regardless of whether the inner pocket 204 is holding an item, such as a mobile phone. As a result, both pockets can be used at the same time.

In some implementations, the inner pocket 204 can be made of a different material than at least one of the side rail 110A and the pocket 118. For example, as shown in FIG. 3, the inner pocket 204 is made of a more rigid, leather-like material while the outer panel 200 of the pocket 118 is made of the same flexible upholstery material of the side rail 110A. Sometimes, the inner pocket 204 can be made of a same material as at least one of the side rail 110A and the pocket 118. For example, as shown in FIG. 4, the inner pocket 204 is made of the same flexible upholstery material as both the outer panel 200 and the side rail 110A. In some implementations, the inner pocket 204 can be made of a fabric material, leather, vinyl, and/or plastic.

A charging port housing 206 can also be included in the cavity 202 of the pocket 118. The charging port housing 206 can be positioned adjacent to the inner pocket 204. The charging port housing 206 can be positioned along an edge of the inner pocket 204 that is proximate a midpoint of the pocket 118. In some implementations, the charging port housing 206 can be mounted in the inner pocket 204 adjacent an inner surface of the inner pocket 204. Sometimes, the charging port housing 206 can be positioned inside the inner pocket 204.

The charging port housing 206 can be a rigid structure that includes one or more charging ports, such as a USB port and a USB-C port, for wired charging of devices placed in the pocket 118 and/or around the bed system 100. The charging port housing 206 can be made of a plastic material.

Cables can be run from the charging ports of the charging port housing 206 to a power supply of the bed system 100 (not depicted). The power supply can provide power to various components of the bed system 100. For example, the USB and/or USB-C ports in the charging port housing 206 can be in wired communication with the power supply to receive power for charging devices placed in the pocket 118, the inner pocket 204, and/or anywhere near the bed system 100. The power supply can also connect to an outlet in a bedroom environment via wire. For example, a single cable can run from the power supply of the bed system 100 to an external power supply, such as a wall outlet in the bedroom. Accordingly, the bed system 100 can be powered by a single cable connected to an external power supply instead of requiring separate cables for various components of the bed system 100 connecting to external power supplies, thereby freeing up the external power supplies to be used for other devices, such as nightstand devices and lights in the bedroom environment.

Figure 5:
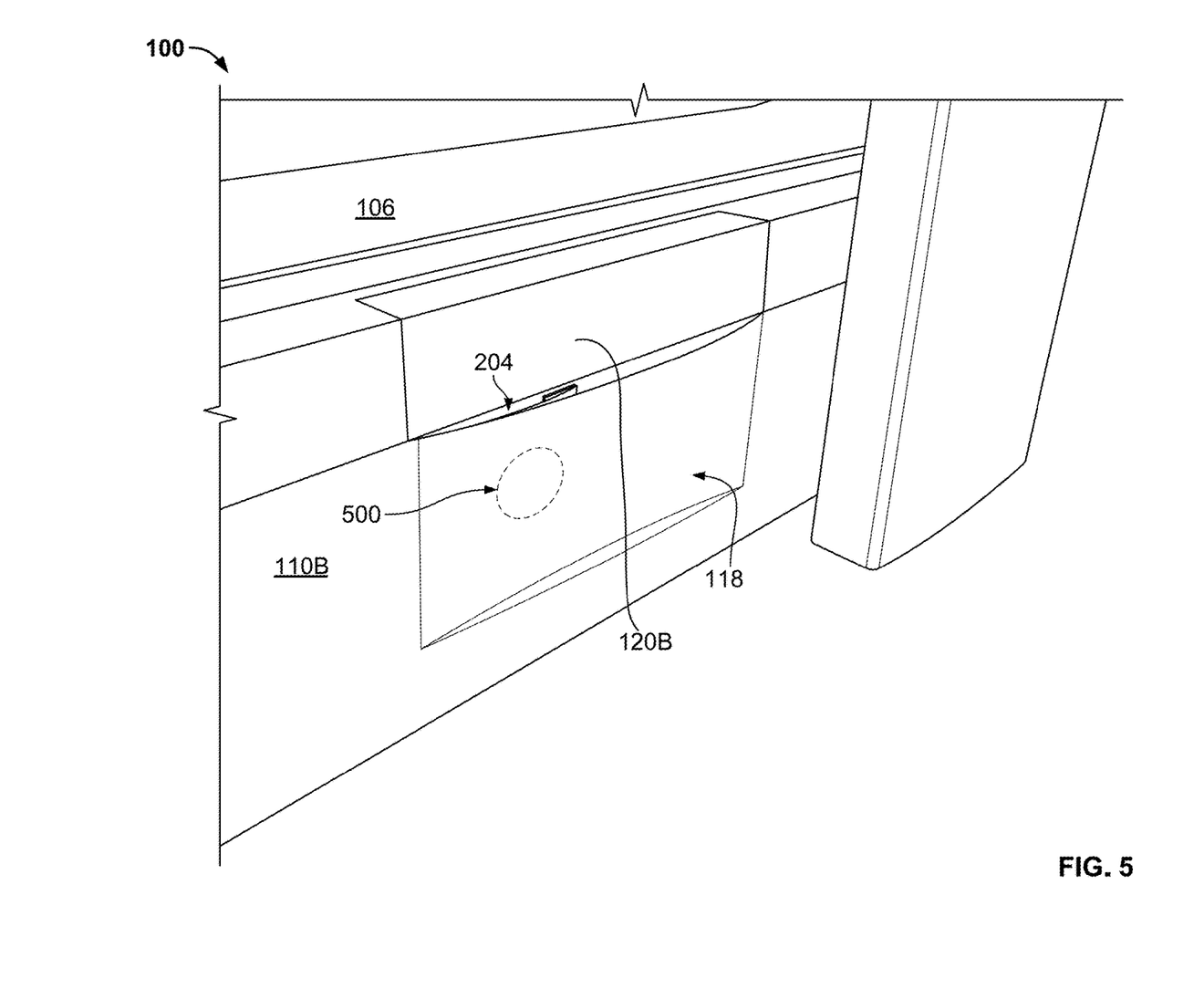
FIG. 5 depicts a pocket on a side rail of the bed system.

FIG. 5 depicts pocket 118 on a side rail 110B of the bed system 100. As described throughout this disclosure, a pocket 118 can be positioned on each of the side rails 110A and 110B. The pocket 118 integrated into the side rail 110B can be the same as the pocket 118 described above in reference to the side rail 110A. Whereas the pocket 118 integrated into the side rail 110A can be configured for right-sided use by a user of the bed system 100, the pocket 118 integrated into the side rail 110B can be configured for left-sided use by a user of the bed system 100.

As shown in FIG. 5, the pocket 118 on the side rail 110B includes the inner pocket 204. An induction charger 500 is also integrated into the side rail 110B of the bed system 100. The induction charger 500 can be placed inside a padded cavity in a wood structure of the side rail 110B. An upholstery fabric of the side rail 110B can then be placed over the induction charger 500. Although not depicted in FIG. 5, an induction charger 500 can also be integrated into the side rail 110A. The induction charger 500 can include a wireless charger and a transmitter for providing induction charging to a mobile device placed inside the inner pocket 204. Accordingly, the induction charger 500 can be integrated into a structure of the side rail 110B at a location opposite the inner pocket 204. In some implementations, the induction charger 500 can be integrated into the structure of the side rail 110B at a location parallel a midpoint of the inner pocket 204. As a result, a mobile device placed inside the inner pocket 204 can be wirelessly charged by the induction charger 500. In some embodiments, the induction charger 500 can be integrated into the structure of the first side rail at a location opposite a midpoint of the pocket 118 to provide wireless charging for devices placed inside the pocket 118.

The induction charger 500 can provide 5 W to 15 W of output. In some implementations, the induction charger 500 can provide 10 W of output for wireless charging. One or more other ranges of output can also be provided by the induction charger 500.

Figure 6:
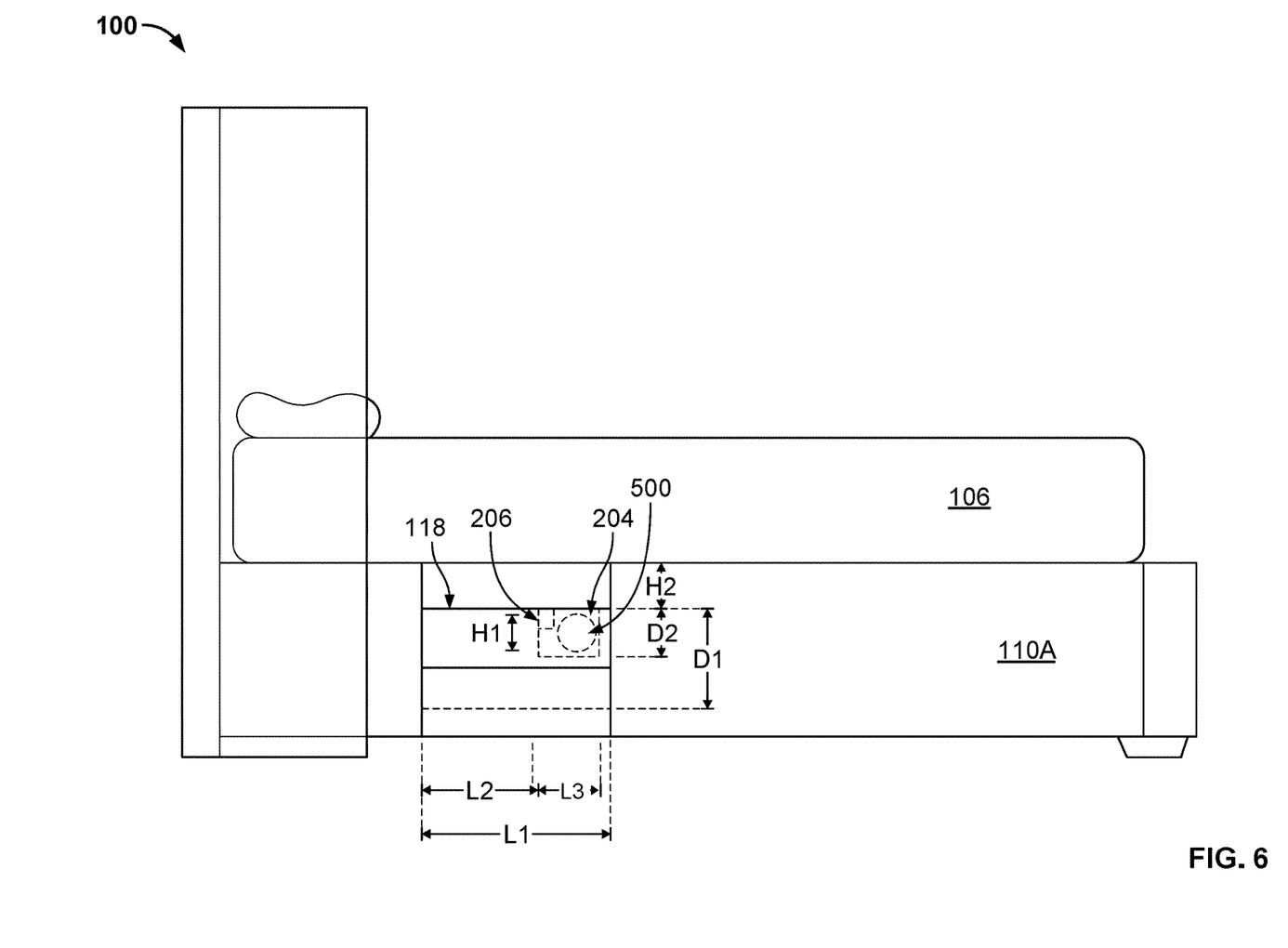
FIG. 6 depicts a side view of the bed system with the pocket.

FIG. 6 depicts a side view of the bed system 100 with the pocket 118. The pocket 118 can extend a length L1 along the side rail 110A. L1 can be 455 mm. The pocket 118 can have a depth D1, which can be 152 mm. The inner pocket 204 can be positioned a length of L2 from a lateral edge of the pocket 118 closest to a head end of the mattress 106. L2 can be 270 mm. the inner pocket 204 can have a length L3, which can be 165 mm. The inner pocket 204 can also be positioned a distance of 20 mm away from a lateral edge of the pocket 118 that is closest to a foot end of the mattress 106.

The charging port housing 206 can be positioned a height H1 inside the inner pocket 204 from a bottom edge of the inner pocket 204. H1 can be 46 mm. The induction charger 500 can be located along the side rail 110A at a position parallel to a midpoint of the inner pocket 204. The inner pocket 204 can have a depth D2, which can be 102 mm. A top of the pocket 118 and the inner pocket 204 can be a height H2 from a top surface of the side rail 110A. H2 can be 102 mm.

in some embodiments, the measurements L1, L2, L3, D1, D2, H1, and/or H2 can vary depending on a configuration and/or size of the bed system 100 and components therein (such as the side rail 110A and the mattress 106). For example, in some embodiments L1 can be 250-600 mm (e.g., 4 to 20 inches), L2 can be 100-550 mm, L3 can be 100-250 mm, D1 can be 100-400 mm, D2 can be 50-200 mm, H1 can be 20-150 mm, and/or H2 can be 10-150 mm. Moreover, the same or similar measurements L1, L2, L3, D1, D2, H1, and H2 can be used for the pocket 118 that is integrated into the side rail 110B of the bed system 100, opposite the side rail 110A.

While this specification contains many specific implementation details, these should not be construed as limitations on the scope of the disclosed technology or of what may be claimed, but rather as descriptions of features that may be specific to particular embodiments of particular disclosed technologies. For example, in some embodiments, the same of pockets, inner pockets, charging port housing, charting ports, wireless charging, foundations, side rails, mattresses, or other features can be varied as suitable for the application. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A bed system comprising:
a foundation having a first side rail and a second side rail, the first side rail opposite the second side rail; and
a pocket integrated into an exterior side of the first side rail,
wherein the first side rail comprises a wireless charger and a transmitter integrated therein for providing induction charging to a user device placed inside the pocket, wherein the wireless charger and the transmitter are integrated into a structure of the first side rail at a location opposite the pocket.

2. The bed system of claim 1, further comprising a second pocket integrated into the second side rail.

3. The bed system of claim 1, wherein the pocket is integrated into the first side rail at a distance from a head section of a mattress that is less than a distance from a foot section of the mattress.

4. The bed system of claim 1, wherein the pocket comprises an inner pocket, the inner pocket being smaller than the pocket and positioned inside the pocket, wherein the inner pocket is positioned at a lateral edge of the pocket and extends a distance towards a midpoint of the pocket.

5. The bed system of claim 4, wherein the pocket further comprises a charging port housing and a charging port supported by the charging port housing, the charging port being mounted in the inner pocket adjacent an inner surface of the inner pocket.

6. The bed system of claim 5, wherein the charging port housing is positioned along an edge of the inner pocket that is proximate the midpoint of the pocket.

7. The bed system of claim 5, wherein the bed system further comprises a power supply, wherein a USB port and a USB-C port of the charging port housing are in wired communication with the power supply to receive power for charging the user device placed in the pocket.

8. The bed system of claim 1, wherein the pocket has a width within a range of 250-600 mm.

9. The bed system of claim 1, wherein the pocket is made of a same material as the first side rail.

10. A bed system comprising:
a foundation having a first side rail and a second side rail;
a first pocket integrated into an exterior side of the first side rail; and
a second pocket integrated into the exterior side of the first side rail and positioned inside the first pocket, wherein the first pocket further comprises a charging port housing and a charging port supported by the charging port housing, the charging port housing being positioned along an edge of the second pocket that is proximate a midpoint of the first pocket and the charging port being mounted in the second pocket adjacent an inner surface of the second pocket.

11. The bed system of claim 10, wherein the second pocket is smaller than the first pocket, the second pocket being positioned at a lateral edge of the first pocket and extending a distance towards the midpoint of the first pocket.

12. A bed system comprising:
a foundation having a first side rail and a second side rail;
a first pocket integrated into an exterior side of the first side rail; and
a second pocket integrated into the exterior side of the first side rail and positioned inside the first pocket, wherein the first side rail includes a wireless charger and a transmitter integrated therein for providing induction charging to a user device placed inside at least one of the first pocket and the second pocket, the wireless charger and the transmitter being integrated into a structure of the first side rail at a location opposite a midpoint of at least one of the first pocket and the second pocket.

13. A bed system comprising:
a foundation having a first side rail and a second side rail;
a pocket integrated into an exterior side of the first side rail having charging capabilities for a user device placed therein; and
a power supply configured to provide power to components of the bed system, the power supply being in wired communication with an external power source, wherein the first side rail includes a wireless charger and a transmitter integrated into a structure of the first side rail at a location opposite the pocket for providing induction charging to the user device placed inside the pocket.

14. A bed system comprising:
a foundation having a first side rail and a second side rail;
a pocket integrated into an exterior side of the first side rail having charging capabilities for a user device placed therein;
a power supply configured to provide power to components of the bed system, the power supply being in wired communication with an external power source; and
an induction charger integrated into a structure of the first side rail at a location parallel a midpoint of the pocket, wherein the induction charger is configured to wirelessly charge the user device placed inside the pocket.

15. The bed system of claim 13, wherein the pocket further comprises a charging port housing and a charging port supported by the charging port housing that receives power from the power supply.

16. The bed system of claim 15, wherein the charging port is a USB port, the pocket further comprises a USB-C port, and wherein the USB port and the USB-C port are in wired communication with the power supply to receive power for charging the user device placed in the pocket.

17. The bed system of claim 14, wherein the induction charger is placed inside a padded cavity in the structure of the first side rail and an upholstery fabric material of the first side rail covers the induction charger inside the padded cavity.

* * * * *